(12) United States Patent
Almajan et al.

(10) Patent No.: US 12,399,766 B2
(45) Date of Patent: Aug. 26, 2025

(54) CENTRAL PROCESSING UNIT SYSTEM AND METHOD WITH IMPROVED SELF-CHECKING

(71) Applicant: NXP USA, Inc., Austin, TX (US)

(72) Inventors: Iani Bogdan Almajan, Bragadiru (RO); Julien Olivain, Grasse (FR); Joseph Charles Circello, Phoenix, AZ (US)

(73) Assignee: NXP USA, Inc., Austin, TX (US)

( * ) Notice: Subject to any disclaimer, the term of this patent is extended or adjusted under 35 U.S.C. 154(b) by 192 days.

(21) Appl. No.: 18/191,616

(22) Filed: Mar. 28, 2023

(65) Prior Publication Data
US 2024/0241780 A1 Jul. 18, 2024

(30) Foreign Application Priority Data
Jan. 12, 2023 (RO) .................................. 2023 00008

(51) Int. Cl.
*G06F 11/00* (2006.01)
*G06F 9/38* (2018.01)
*G06F 11/07* (2006.01)

(52) U.S. Cl.
CPC .......... *G06F 11/079* (2013.01); *G06F 9/3802* (2013.01); *G06F 11/0721* (2013.01)

(58) Field of Classification Search
CPC .... G06F 11/079; G06F 11/0721; G06F 11/22; G06F 11/226; G06F 11/2236; G06F 11/16; G06F 11/1629; G06F 11/3024
See application file for complete search history.

(56) References Cited

U.S. PATENT DOCUMENTS

| | | | |
|---|---|---|---|
| 5,561,672 A * | 10/1996 | Kaneko | G06F 3/0601 714/E11.006 |
| 6,233,702 B1 | 5/2001 | Horst | |
| 2010/0268987 A1* | 10/2010 | Clark | G06F 9/3867 712/32 |
| 2017/0371739 A1 | 12/2017 | Pondke | |
| 2019/0042476 A1* | 2/2019 | Chhabra | G06F 21/85 |
| 2019/0102242 A1 | 4/2019 | Sullivan et al. | |

(Continued)

OTHER PUBLICATIONS

Amit Goel & Ankur Sharma, "Dual core architectures in automotive SoCs," EE Times, Freescale Semiconductor, Aug. 23, 2010, 6 pages.

(Continued)

*Primary Examiner* — Philip Guyton
*Assistant Examiner* — Sean Kevin McNamara

(57) ABSTRACT

Self-checking central processing unit (CPU) systems and methods are provided, in which the self-checking CPU systems include a core monitor that performs checking functions to monitor and verify the executions of a primary CPU. The primary CPU has a primary processor pipeline, and the core monitor has a checker pipeline that is parallel to the primary processor pipeline. The core monitor performs checking functions during each stage of the primary processor pipeline, where the type of each checking function is based on a corresponding type of function being performed by the primary CPU. For example, the core monitor may perform parity checking for data transfers and logical operations performed by the primary CPU, and residue checking for arithmetic instruction execution logic performed by the primary CPU.

16 Claims, 4 Drawing Sheets

(56) References Cited

U.S. PATENT DOCUMENTS

| | | | | |
|---|---|---|---|---|
| 2020/0089559 | A1* | 3/2020 | Ainsworth | G06F 11/1629 |
| 2020/0192742 | A1* | 6/2020 | Boettcher | G06F 11/0721 |
| 2020/0412388 | A1* | 12/2020 | Hofmann | G06F 7/724 |
| 2021/0224426 | A1* | 7/2021 | Cui | G06F 21/74 |
| 2022/0100666 | A1* | 3/2022 | Ishii | G06F 9/3806 |
| 2023/0326265 | A1* | 10/2023 | Law | G07C 5/008 |
| | | | | 701/33.4 |

OTHER PUBLICATIONS

A. Meixner, M. E. Bauer and D. Sorin, "Argus: Low-Cost, Comprehensive Error Detection in Simple Cores," 40th Annual IEEE/ACM International Symposium on Microarchitecture (MICRO 2007), 2007, 13 pages.

John F. Wakerly, "Principles of Self-Checking Processor Design and an Example", Digital Systems Laboratory Stanford Electronics Laboratories, Stanford University, Stanford, California, Technical Report No. 115, Dec. 1975, 52 pages.

\* cited by examiner

CENTRAL PROCESSING UNIT SYSTEM AND METHOD WITH IMPROVED SELF-CHECKING

CROSS-REFERENCE TO RELATED APPLICATIONS

This application claims the priority under 35 U.S.C. § 119 of Romanian Patent application no. a 2023 00008, filed on 12 Jan. 2023, the contents of which are incorporated by reference herein.

FIELD OF THE DISCLOSURE

The present disclosure relates to central processing unit ("CPU") systems and methods and, more particularly, the present disclosure relates to self-checking CPU systems and methods.

BACKGROUND OF THE DISCLOSURE

System reliability or safety is a major concern for many types of electrical and electronics systems, including Systems-on-Chip ("SoCs"). For example, in the automotive industry, the complexity of applications has been ever increasing, resulting in a higher chance of failure of hardware or software. Standards and metrics for functional safety, such as ASIL-D (Automotive Safety Integrity Level D) for vehicle systems, require that the designs of electrical and electronics systems have to be robust enough that any failures can be detected and corrective actions can be taken.

Lockstep systems are a solution that has been developed to meet functional safety standards while not complicating software development. Lockstep systems are fault-tolerant computer systems that use a dual module redundancy ("DMR") approach, in which the CPU is duplicated, to run the same set of operations at the same time in parallel on the separate CPUs. The redundancy (duplication) allows error detection: the output from lockstep operations can be compared to determine if there has been a fault if there are at least two systems (dual modular redundancy). This is normally done on a cycle by cycle basis. A major benefit of lockstep is that it is transparent for software; thus software engineers can develop their software code ignoring the added complexity needed to detect random hardware faults (being either permanent or transient).

There are also several drawbacks that result from using lockstep. One issue of lockstep systems is the complete duplication of the CPU, which results in penalties in die size and power consumption, as well as increased costs as compared to a single core design. Another issue is that failure modes may occur that lead to desynchronization of CPUs. Usually, lockstep CPUs operate with the duplicate CPU being a few clock stages (e.g., two clock stages) delayed as compared to the primary CPU. If an error occurs leading one CPU of the lockstep to be delayed in its execution, the lockstep logic is likely to detect this as a fault. The fault detection is considered to be false because a delay of a few stages is not a fault that would not lead to a system failure. One example of a desynchronization type false fault is a correctable fault in the memories (both data and/or instructions), which can often be corrected within one additional cycle. Another example is a fault in the branch prediction logic, which could normally be corrected by a pipeline flush.

It would be advantageous if new or improved systems could be developed, and/or improved methods of operation or implementation could be developed, so as to address any one or more of the drawbacks of lockstep systems discussed above, or to address one or more other concerns or provide one or more benefits.

Figure 1:
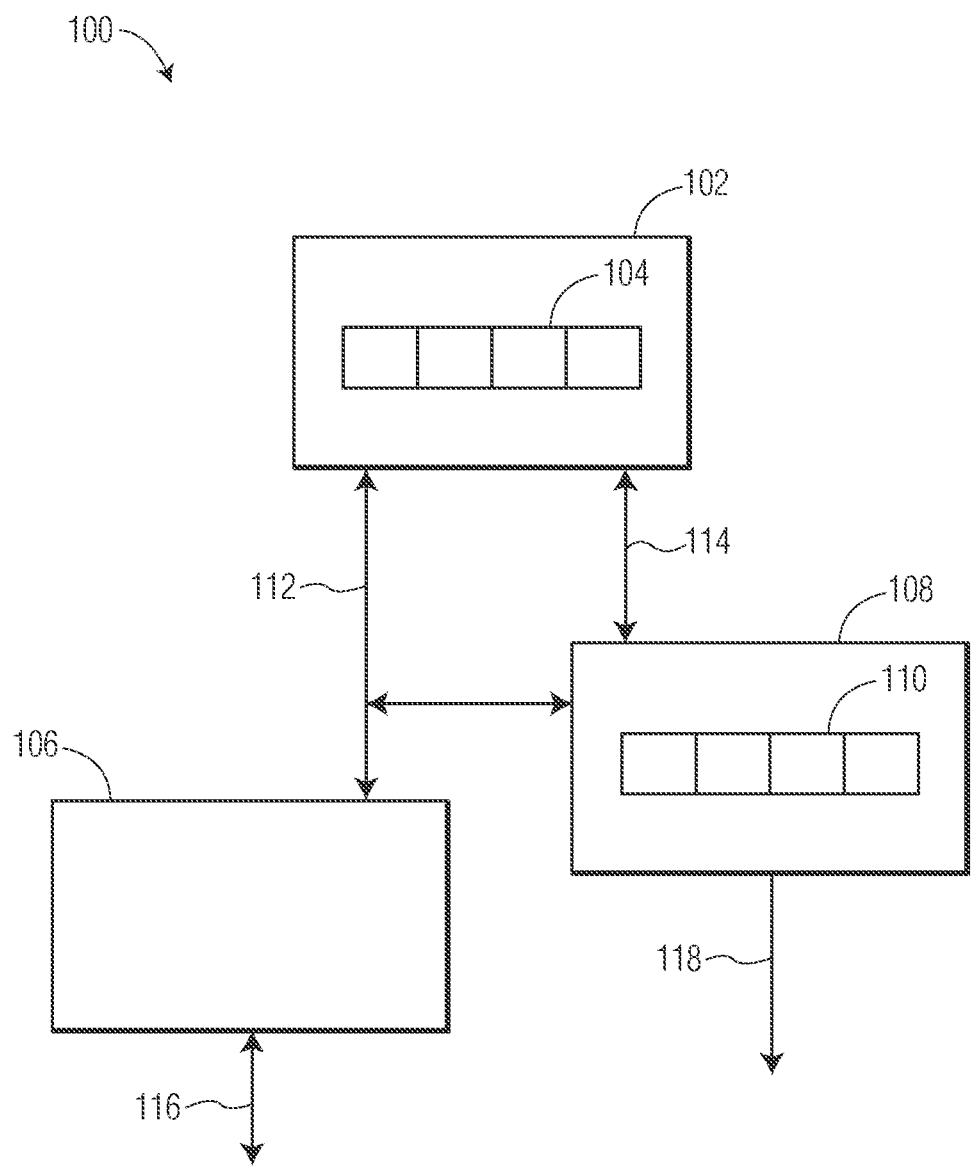
FIG. 1 is a block diagram of one example of a self-checking CPU system of the present technology.

While various embodiments discussed herein are amenable to modifications and alternative forms, aspects thereof have been shown by way of example in the drawings and are described in detail herein. It should be understood, however, that the disclosure is not limited to the particular embodiments described, and instead is meant to include all modifications, equivalents, and alternatives falling within the scope of the disclosure. In addition, the terms "example" and "embodiment" as used throughout this application is only by way of illustration, and not limitation, the Figures are not necessarily drawn to scale, and the use of the same reference symbols in different drawings indicates similar or identical items unless otherwise noted.

DETAILED DESCRIPTION

The present technology includes self-checking CPU systems and methods. Self-checking CPU systems of the present technology do not entail a full DMR. Instead, a core monitor checks the execution of the primary processor based on a hybrid checking approach using at least two error detection schemes. In at least one example, the hybrid checking approach may include the use of parity checking for data transfers and logical operations, and the application of residue checking, which may also be referred to as being a signature, for the CPU arithmetic instruction execution logic. Both the application of parity and residue checking typically requires the calculation of new values (both parity and residue) at the completion of each instruction. From an instruction execution viewpoint, each update to the CPU's program-visible register state generally requires the associated parity and residue values to also be updated. Self-checking CPU systems and methods of the present technology may provide improved fault tolerance versus a simple single-core design, but without one or more of the drawbacks associated with the core duplication required for lockstep systems.

FIG. 1 is a block diagram of one example of a self-checking CPU system 100 of the present technology. The self-checking CPU system 100 includes a primary CPU 102 that performs executions of instructions relating to the primary functionality of the CPU system 100. The primary CPU 102 has a primary processor pipeline 104 that has multiple stages. For example, the primary processor pipeline 104 may have four stages, the primary CPU 102 thus being a four stage pipelined CPU. It should be understood that the set of multiple stages repeats in successive cycles during the operation of the self-checking CPU system 100. The CPU system also includes a bus interface unit 106 and a core monitor 108. The core monitor 108 has a checker pipeline 110 that is parallel to the primary processor pipeline 104, and may have the same number of stages as the primary processor pipeline. The core monitor 108 operates during each of the stages of the primary processor pipeline 104. Internal bus signals 112 may be transferred between the primary CPU 102 and the bus interface unit 106. Internal CPU signals and controls 114 may be transferred between the primary CPU 102 and the core monitor 108. The bus interface unit 106 generates and interfaces with the system bus interface signals 116. The core monitor 108 generates and outputs a fault detection signal 118 when a fault is detected by the core monitor 108.

The core monitor 108 is not a duplicate of the primary CPU 102, and the checker pipeline 110 is not a duplicate of the primary processor pipeline 104. The core monitor 108 may perform checking functions during each stage of the primary processor pipeline. The core monitor 108 implements checking functions that are used to monitor and verify the executions of the primary CPU 102, and to detect whether there is a fault in the executions performed by the primary CPU. The type of each checking function may be dynamically selected by the core monitor 108 based on the corresponding type of operation being performed by the primary CPU 102. One of the checking functions that may be performed by the core monitor 108 is residue checking for the CPU arithmetic instruction execution logic. Another checking function that many be performed by the core monitor 108 is parity checking for data transfers and logical operations. Parity checking may be byte parity checking, such as odd byte parity checking or even byte parity checking. The checking functions may include a hybrid checking approach that include performing parity checking for data transfers and logical operations, and residue checking for the CPU arithmetic instruction execution logic.

The figures provided herein illustrate functional blocks of CPU systems. It should be understood that a functional block may be implemented using hardware, software, or a combination of hardware and software. Generally, CPU systems of the present technology include at least one processor, and at least one memory device coupled at least indirectly to the at least one processor. CPU systems of the present technology may include multiple processors and multiple memory devices, where each memory device is coupled at least indirectly to at least one of the multiple processors. Each memory device may be any suitable type of memory device, including for example, volatile or non-volatile memory. The memory devices in the CPU system may include at least one memory storage device that stores computer readable instructions that, when implemented by at least one processor, cause the at least one processor to perform functions in accordance with the methods of the present technology (described more fully below).

With respect to the components of CPU systems described herein, whether described as functional blocks or physical hardware, when two components are "coupled at least indirectly," they are operatively connected, with input and output devices as needed, in a manner that allows registers, such as data and/or other communications, to be transferred from at least one of the devices to the other device, such as by way of one or more communication links that may be wired or wireless communication links.

Figure 2:
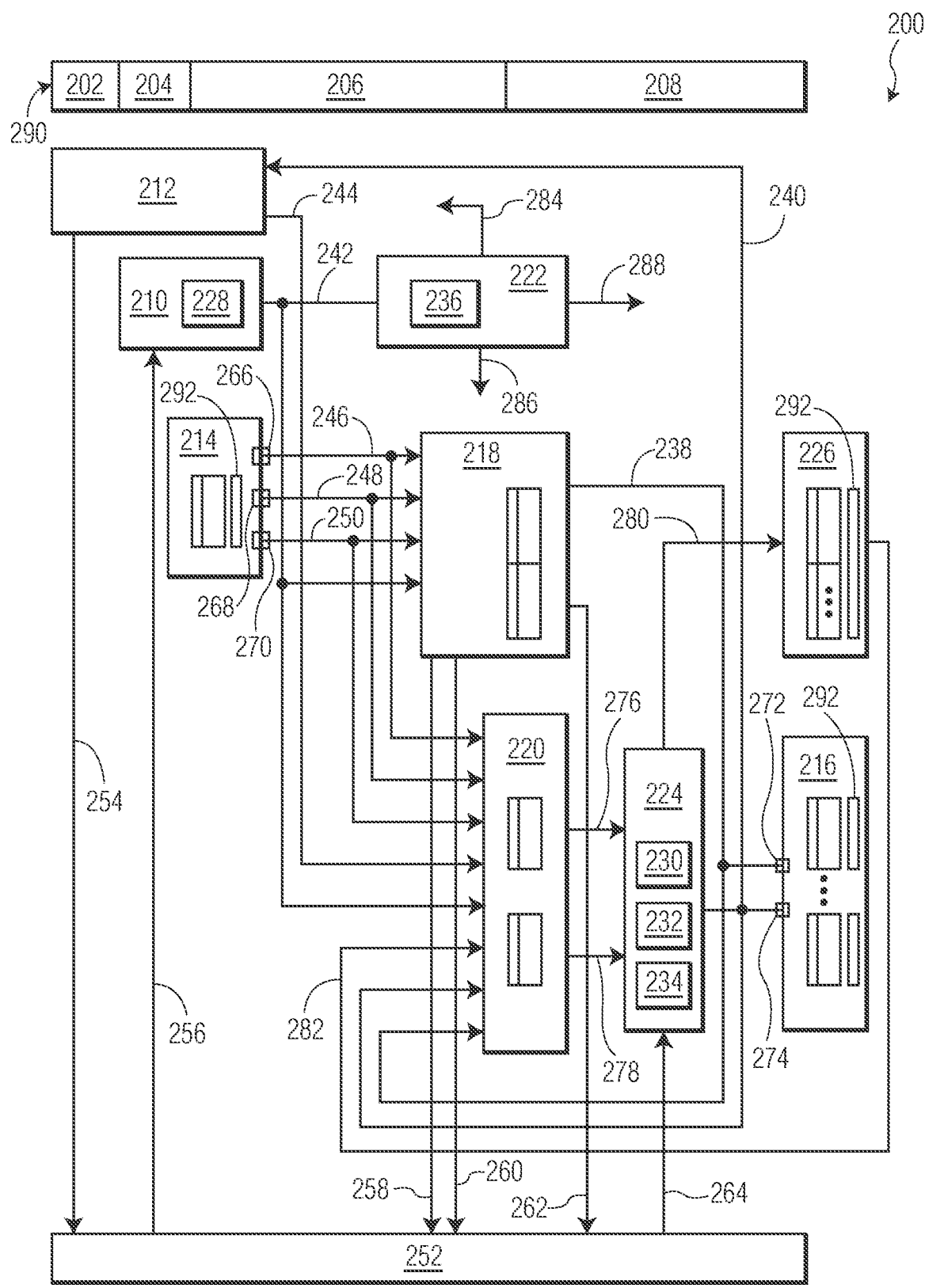
FIG. 2 is a block diagram providing a spatial diagram a core monitor of the present technology, including pipeline stages for the checker pipeline, that may be used in the self-checking CPU system of FIG. 1.

FIG. 2 is a block diagram providing a spatial diagram of a core monitor 200, which may correspond to a core monitor 108 of FIG. 1. FIG. 2 includes a checker pipeline 290, which may correspond to checker pipeline 110 of FIG. 1. In this example herein, the checker pipeline 290 may be a four stage RISC-V processor pipeline. In FIG. 2, "time" is shown on the x-axis proceeding from left-to-right. The individual pipeline stages are depicted at the very top of the block diagram, and define columns that each correspond to a clock stage of the CPU system 100. The left-edge of each stage corresponds to the clock edge defining the beginning of each clock stage. The four pipeline stages of checker pipeline 290 include: a first Instruction Address Generation (IAG) stage 202; a second Instruction Cycle (IC) stage 204; a third Decode & Select, (data) Address Generation (DSAG) stage 206; and a fourth Execute, Data Cycle (EXDC) stage 208.

The checker pipeline 290 may have a scalar issue four-stage pipeline design that has two separate, decoupled pipelines, one for instruction fetch and the other for instruction execution. The fetch pipeline, also referred to as the Instruction Fetch Pipeline (IFP), may consist of the IAG 202 and IC 204 stages. The execution pipeline, also referred to as the Operand Execution Pipeline (OEP), may consist of the DSAG 206 and EXDC 208 stages. For the execution pipeline, the two stages have "dual" operations. For simple register-to-register instructions, the execute pipeline stages operate as instructions to decode and select the register operands, and then execute {DS, EX}. Such instructions typically have single-cycle execution times. Additionally, for the data memory load and store operations, the execute stages operate as instructions for address generation and data cycle {AG, DC} where the structure of the core monitor 200 supports single-cycle execution times for the load and store operations.

The primary inputs and outputs for the core monitor 200 are provided to the system bus interface unit 252, which may correspond to a system bus interface unit 106 of FIG. 1. The core monitor 200 may support a Harvard memory organization, and may implement separate 32-bit instruction fetch and 32-bit data load and store bus using the AMBA-AHB (Advanced Microcontroller Bus Architecture-Advanced High-performance Bus) bus protocol available from Arm Ltd. of Cambridge, England. The AHB protocol supports a standard two-stage memory pipeline corresponding to an address phase followed by a data phase, where the address and attributes are sent to the 1st stage of this pipeline with data being valid in the 2nd stage. The primary inputs and outputs for the core monitor 200 may include: Data memory AHB Address (DHADDR) 260; Data memory AHB Read Data (DHRDATA) 264; Data AHB Write Data, Address Phase for "early writes" (DHWDATA_AP) 258; Data AHB Write Data, Data Phase for "late writes" (DHWDATA_DP) 262; Instruction memory AHB Address (IHADDR) 254; Instruction memory AHB Read Data (IHRDATA) 256.

The core monitor 200 as shown in FIG. 2 illustrates nine processor hardware modules of the core monitor 200, and several internal registers, with a focus on maximizing local (intra-module) signal connections and minimizing the inter-module signal connections. Any one or more, including up to all, of the hardware modules of the core monitor 200 may also be a hardware module of the primary CPU 102 (FIG. 1). The hardware modules in FIG. 2 are not drawn to scale. Some of the hardware modules are depicted as extending across multiple pipeline stages, while others are depicted within a single stage. The hardware modules include: Instruction Fetch DataPath (IFDP) 210; Program Counter DataPath (PCDP) 212; Register File, read ports (RGF-RD)

214, Register File, write ports (RGF-WT) 216; data Address Generation Unit (AGU) 218; input OPerand MultipleXers (OPMXs) 220; Pipeline Control Logic (PCL) 222; Execution module (EX) 224; and Control/Status Registers (CSR) 226. The internal registers and/or signals include: an Address Result, DC pipeline stage (AR_DC) register 238; an Execute Result, EX pipeline stage (ER_EX) signal signal 240; a Registered INSTruction, DSAG pipeline stage (IN-ST_DSAG) register 242; a Program Counter, DSAG pipeline stage (PC_DSAG) register 244; a Register File, operand A (RA) 246; a Register File, operand B (RB) 248; and Register File, operand D (RD) 250.

The Instruction Fetch DataPath (IFDP) 210 may include an instruction Buffer (IBUF) 228, which may be a first-in-first-out (FIFO) instruction buffer and may be used to provide the decoupling mechanism between the fetch and execution pipelines. The Instruction Fetch DataPath (IFDP) 210 may implement a virtual pipeline stage (IB, which is not shown) between the IC and DSAG stages. Additionally, the instruction Buffer (IBUF) 228 may implement 3-word registers and provide an efficient coupling mechanism. Registers of the instruction Buffer (IBUF) 228 may operate as a FIFO, with writes controlled by the arrival of instruction memory fetched instructions 256 in the IC stage and reads controlled by instruction completion in the DSAG stage of the execute pipeline. The IFDP 210 performs a checking function, namely, parity checking, with respect to the memory fetched instructions during the IC stage, registered in 228 and then subsequently loaded into the execution pipeline via 242.

The Program Counter DataPath (PCDP) 212 may implement the instruction address (IA) generation and tracking, from the IAG stage through the DSAG stage. The address is described as IA in the fetch pipeline and program counter (PC) in the execute pipeline. The PCDP 212 may include a multiplexer (or "mux," not shown) that, during the IAG stage, selects the next fetch address from the next-sequential (last_IA+4) or a target instruction address based on a branch instruction in the execute pipeline. Likewise, another mux (not shown) may select the next-state PC during the IC stagestage. While the execute pipeline is executing sequential instructions, the next-sequential PC value may be continuously selected. If any type of "coupling" event occurs due to a branch instruction being executed, then the target instruction address may be selected. Another mux (not shown) position may be used for system startup after the reset input signal is negated. The logic of the Program Counter DataPath (PCDP) 212 generates the target instruction address for every type of branch instruction (unconditional branches, both taken/not taken conditional branches and function calls and returns). The PCDP 212 performs residue checking on the next fetch address that is selected during the IAG stage.

The Register File, read ports (RGF-RD) 214 and Register File, write ports (RGF-WT) 216 may be implemented in any suitable manner, such as a single general-purpose register file, even though FIG. 2 shows two different hardware structures. The register file functionality is shown in FIG. 2 as being split across two stages of the execute pipeline: reads during the DSAG stage by RGF-RD 214 and writes during the EXDC stage by RGF-WT 216. In an example where a single general purpose register file is used, and the core monitor 200 is a four stage RISC-V processor pipeline, the register file may have 31×32b registers, with register $R_0$ being hardwired to all zeroes and the remaining registers Rn (n=[1-31]) being fully programmable by the RISC-V instruction set architecture. The basic organization may be a (3R, 2W)-RGF organization, meaning that there are three read ports 266, 268, and 270 (corresponding to RA 246, RB 248, and RD 250) and two write ports 272 and 274. The first write port 272 receives the AR_DC register 238 from the data Address Generation Unit (AGU) 218. The second write port 274 receives the ER_EX signal 240. During the EXDC 208 stage, the functionality of the Register File, write ports (RGF-WT) 216 may include a mux (not shown) that selects the next-state value for each general-purpose register, Rn (where n=[1-31]). The prioritized input values may be selected from the Address result (AR_DC) or the highest priority Execute Result (ER_EX) bus. The AR_DC input may be associated with an effective address register update, while the ER_EX input may represent most of the results from instruction execution.

The data Address Generation Unit (AGU) 218 may implement the data address generation for all memory load and store instructions. The DSAG stage corresponds to the address phase for the data memory access. It also sources two versions of data memory write data on store instructions. The structure for the effective address generation may include two input muxes (not shown) that select the base and the combined index/displacement ndx_dsp and then sum the base+ndx_dsp operands in the effective address adder. Results of the data memory load/store address generation may be captured in the AR_DC register 238 for subsequent register file updates or instruction operand generation. The execute pipeline may support two different data memory write protocols depending on the selected memory. For certain writes to the data memory, for example, to a tightly coupled memory, the pipeline may perform an "early write" and sources both the DHADDR 260 and DHWDATA_AP 258 during the AG stage. For writes to a more traditional data memory (a so-called "late write"), the standard AHB protocol may be followed with the address phase corresponding to the AG stage, and write data selected, registered and then driven (DHWDATA_DP 262) during the DC as the AHB data phase.

The input OPerand MultipleXers 220 may implement the DSAG stage input operand selection. The input OPerand MultipleXers 220 may output two input operand registers, opA_ex 276 and opB_ex 278. The switch positions may define the basic input operand select functions, including the "feedforward" paths associated with the address result AR_DC 238 and the execute result ER_EX 240. The feedforward paths may eliminate a large set of potential pipeline stalls associated with register load/use sequences for improved performance. The input operand A is typically associated with the RA register 246 or RD register 250. The input operand B is associated with the RB register 248 or an immediate data value.

During the third stage, (data) Address Generation (DSAG) stage 206, the OPMX module 220 receives information generated during the first two stages, including the PC_DSAG register 244 from the PCDP and the INST_DSAG register 242 from the IFDP. During the third stage, the OPMX module 220 also receives RA 246, RB 248 and RD 250 from RFG-RD 214. As can be seen in FIG. 2, the OPMX module 220 spans across, the third stage (DSAG stage 206) and the fourth stage (EXDC stage 208). Other inputs into the OPMX module 220 during the third stage (DSAG stage 206) or fourth stage (EXDC stage 208) may include AR_DC register 238 from the AGU 218, the ER_EX signal 240 from the EX module 224, and the checked operand 282 from the CSR module 226.

The Pipeline Control Logic (PCL) module 222 may include an instruction Decode (DCD) submodule 236. The PCL module 222 has several output signals, including instruction fetch pipeline control signals 284, and execution pipeline control signals 286. When the core monitor 200 detects a fault, the PCL module may generate as an output a fault detection signal 288.

The Execution (EX) module 224 may include multiple execute engines, which may be 3-terminal execute engines. The EX module 224 generates the execute result ER_EX 240. The execute engines may include an Arithmetic/Logic Unit (ALU) 230, a Barrel Shifter Unit (BSU) 232, and a Multiply-ACcumulate unit (MAC) 234. For each engine, the two input operands, opA_ex 276 and opB_ex 278, are generated by the OPMX module 220 and routed into the EX module 224. Regardless, from an ISA perspective, one execute engine performs the required operation(s) and generates a result. The EX module 224 then combines all the execute engine results and the data memory read data bus to select the appropriate result for the instruction. The primary output of the EX module 224 is the ER_EX 240, which is routed to the RGF-WT 216 and the feedforward paths in OPMX 220 and AGU 218. During the EXDC stage, the EX module 224 performs residue checking with respect to the ER_EX 240 output generated by the EX module 224. The EX module 224 may perform residue checking by determining a predicted output residue based on a the residue of opA_ex 276 and the residue of opB_ex 278, and comparing the residue of the actual output, the ER_EX 240, to the predicted output.

The Control/Status Registers (CSR) 226 may include multiple optional control and status registers. The EX module may output a source operand 280, which may be written into the Control/Status Registers (CSR) module 226. The CSR module may perform parity checking on the source operand 280, which may include a check when the CSR is read out and sent back to the OPMX module 220. The checked operand 282 may be output from the CSR module 226 to the OPMX 220 for subsequent instructions.

In at least some examples of a core monitor 200, performing checking functions result in generating check codes, including 4-bits for odd 8-bit byte parities on 32-bit operands and 4-bits for the modulo 15 residue check codes. Referring to FIG. 2, the logical registers within the RGF-RD 214, RGF-WT 216 and CSR 226, may include DFF (D flip-flop) register elements 292 as "extensions" (or shadow registers) to the functional Rn and CSRnregisters). Core monitors of the present technology, such as core monitor 108 and core monitor 200, may update the relevant DFF register elements 290 after each instruction that is executed by the CPU system 100.

There may be an optimized interface within the system memory buses, which may include a multi-bit error checking and correcting code (e.g., an SEC/DED=single error correct, double error detect), and the odd byte parities needed internally by the processor.

Since the time needed to generate and/or check a residue code tends to be noticeably longer than the comparable time for odd byte parity, the extended residue codes in the RGF-RD 214 and RGF-WT 216 may also include state information about the residue value, namely {invalid, valid, pending_update}. The processor's operational behavior can be configured under software control based on the state of a CSR defining the error checking configuration and a source register residue extension state.

Regarding the configuration and management of the core monitor, there may be multiple levels of the enable function, since there are certain check functions that must be fully enabled and generating error check data before the logic may be fully enabled to report on detected errors. As a simple example, when the system with memory error coding codes is reset and enabled, the entire memory (data+ SECDED code) must first be initialized before memory read checking can be enabled.

Likewise, the core monitor may implement a multi-level "fault capture & dictionary" to record errors detected by the hardware for subsequent debug and diagnosis.

Further, the core monitor may implement an "end-to-end" checking methodology where input error check codes are modified and not simply regenerated when passing through different modules or functions. This may provide improved fault detection capabilities. All stages of the core monitor 200 may be checked—either via parity checking for simple data movement or logical operation and residue checking for arithmetic operations like add, subtract, multiply and shifts.

Figure 3:
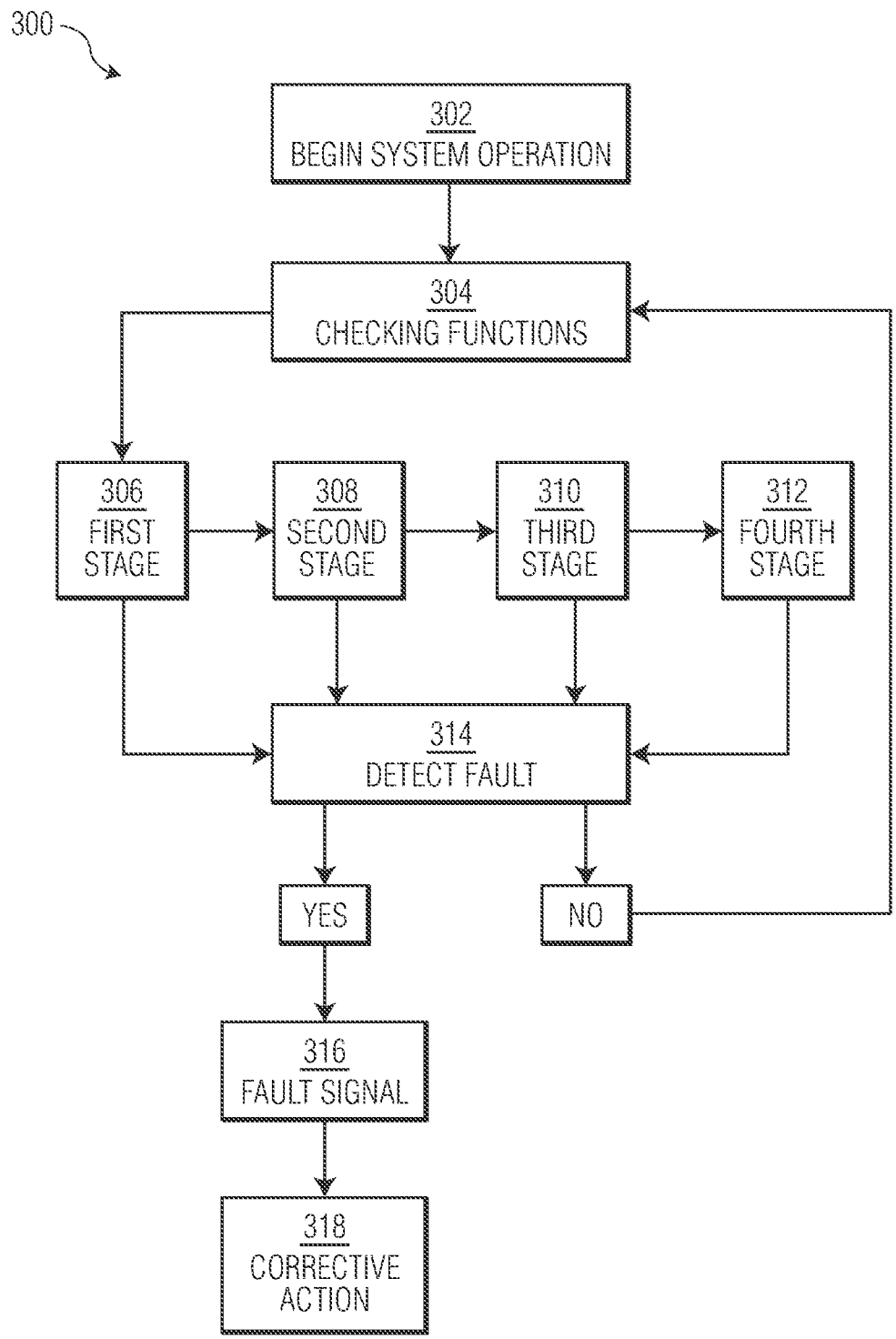
FIG. 3 is a flow chart for a self-checking CPU method that may be used with a self-checking CPU system of FIGS. 1 and 2.

FIG. 3 illustrates one example of a self-checking CPU method 300 of the present technology. The self-checking CPU method 300 may be used with a CPU system 100 of FIG. 1 having a core monitor 200 of FIG. 2. As discussed above, the self-checking CPU system 100 may perform checking functions during each stage of the checker pipeline 290. The method 300 may begin at step 302, which includes beginning operation of a self-checking CPU system that includes a core monitor. The method may proceed to step 304, which includes performing checking functions by the core monitor that determine whether there is a fault in executions performed by the primary CPU. The checking functions may include parity checking for data transfers and logical operations performed by the primary CPU, and residue checking for arithmetic instruction execution logic performed by the primary CPU. The method 300 may include performing checking functions during each stage in the pipeline of operation of the system. Accordingly, when the CPU system is a four stage system, the checker pipeline may include four stages, and the method may include performing checking functions during each of the four stages. In some examples, the stages may include a first stage that is an Instruction Address Generation (IAG) stage, a second stage that is an Instruction Cycle (IC) stage, a third stage that is a Decode & Select, (data) Address Generation (DSAG) stage, and a fourth stage that is an Execute, Data Cycle (EXDC) stage. In examples where there is a four stage pipeline, the method may proceed to step 306, which includes performing checking functions during a first stage. When the core monitor includes a Program Counter DataPath (PCDP), the method may include the PCDP performing residue checking on a next fetch address that is selected by the PCDP. The method may then proceed to step 308, which includes performing checking functions during a second stage. When the core monitor includes an Instruction Fetch DataPath (IFDP), performing checking functions during the second stage may include the IFDP performing parity checking with respect to memory fetched instructions. The method may then proceed to step 310, which includes performing checking functions during a third stage. When the core monitor includes a PCDP and the processor is simply executing sequential instructions, performing checking functions during a third stage may include predicting residue of the next PC_DSAG register 244, which may then be verified in the next DSAG stage. The method may then proceed to step 312, which includes performing checking functions during a fourth stage. When the core monitor includes an execution (EX) module, performing checking functions during a fourth stage may include the EX module performing residue checking with respect to an ER_EX output generated by the EX module. When the core monitor includes Control/Status Registers (CSR), performing checking functions during a fourth stage may include the CSR performing parity checking on a source operand written into the CSR from the EX module. During, or at the conclusion of, each stage, the method includes step 314, which includes the core monitor determining whether a fault has been detected. The core monitor determines whether there is a fault based on the result of the checking functions. If a fault is detected, the method may proceed to step 316, which includes the core monitor sending a fault detection signal 288. Alternatively, or additionally, the method may proceed to step 318, which includes the CPU system taking other corrective action. If a fault is not detected, the method may continue back to step 304 and the core monitor may perform checking functions during the next set of cycle and/or pipeline stages.

Figure 4:
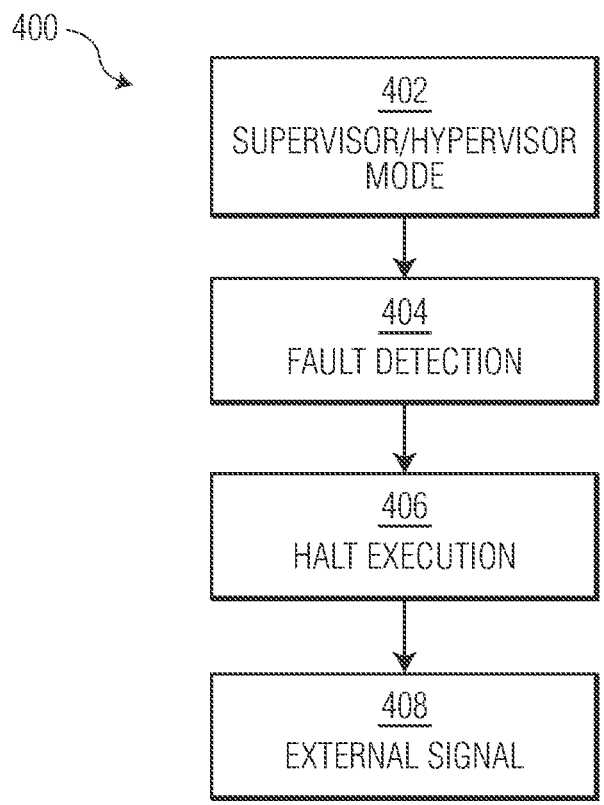
FIG. 4 is a flow chart of one example of a method of operating a self-checking CPU system of FIG. 1 in a operating mode that is a Supervisor mode or a Hypervisor mode.
Figure 5:
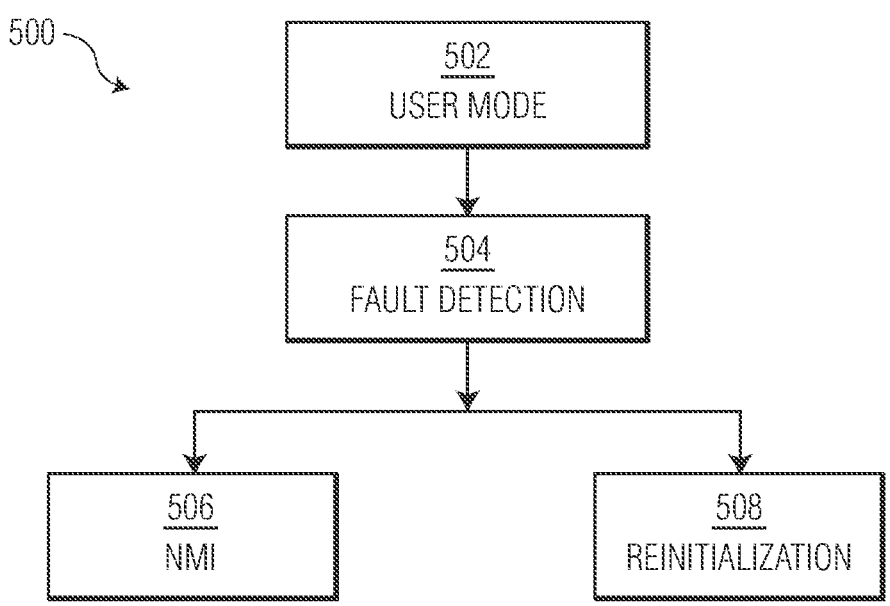
FIG. 5 is a flow chart of one example of a method of operating a self-checking CPU system of FIG. 1 in a operating mode that is a User mode.

Referring to FIGS. 1 and 4-5, the CPU system 100 may have a plurality of operating modes where the core monitor 108 is enabled, including a first operating mode that is a Supervisor mode, a second operating mode that is a Hypervisor mode, and a third operating mode that is a User mode. Additionally, the core monitor 108 may be optionally disabled during any of the operating modes.

When the CPU system 100 is running in the Supervisor (OS) mode or the Hypervisor mode, an OS or a Hypervisor is usually running, and all the CPU features may be able to be accessed. In the either the Supervisor mode or the Hypervisor mode, when the core monitor 108 detects a fault, it is assumed that the OS or Hypervisor is not reliable after an error occurred while the OS or Hypervisor was running. Accordingly, the CPU system 100 may halt execution, and the core monitor 108 may generate a fault detection signal 118, so that the system integrating the CPU system 100 can take corrective action (e.g., initiate a CPU reset).

Accordingly, as shown in FIG. 4, one method 400 of operating a CPU system 100 of the present technology may begin at step 402 with running the CPU system 100 in an Supervisor mode or a Hypervisor mode. The method may include the core monitor 108 detecting a fault at step 404. The method may then continue to step 406, which includes halting execution by the CPU system 100. The method may then continue to step 408, which includes the CPU system 100 may take corrective action by generating an external signal indicating the fault.

A second operating mode is a User mode. In the user mode, lower-priority user tasks are executed. In the User mode, when the core monitor 108 detects a fault, it is assumed that a user-task was running and it is not affecting the OS/Hypervisor functionality. In the user mode, the CPU system 100 may take corrective action. One example of a corrective action is that a non-maskable interrupt (NMI) may be triggered instead of a global fault, in order to allow the CPU system 100 to stop the faulting user-task. Or, if the faulting user-task has a reinitialization sequence, the CPU system 100 can take corrective action by initiating that reinitialization sequence. Other tasks being performed by the CPU system 100 that are not the faulting user-task may not be affected by the detection of the fault by the core monitor 108.

Accordingly, as shown in FIG. 5, one method 500 of operating a CPU system 100 of the present technology may begin at step 502 with running the CPU system 100 in a User mode. The method may include the core monitor 108 detecting a fault at step 504. The method may then continue to step 506, which includes the CPU system taking corrective action by triggering an NMI in order to allow the CPU system 100 to stop the faulting user-task. Alternatively, if the faulting user-task has a reinitialization sequence, the method may continue to step 508, which includes the CPU system 100 taking corrective action by executing the reinitialization sequence.

Residue Calculation Example

With respect to residue computation, there are various methods that could be used, which can be determined by one of ordinary skill in the art. However, as an example, assuming the CPU performs an addition, the following formula shown as Equation (1) should apply:

$$Res(a + b) = Res(a) \oplus SRes(b) \quad (1)$$

where the operation $\oplus$ can be an operation based on addition, not necessarily addition itself. For example, if residue codes are used, then the formula to compute the error check would be as shown in Equation (2):

$$Res(a + b) = (Res(a) + Res(b)) \bmod Base \quad (2)$$

The following provides a simple example showing the basic operation of an arithmetic residue (res) check using modulo $2^n-1$ calculations, for example, mod-15. In this example, the operation is addition, where R=A+B and res(R)=res(A)+res(B). Further, let A=254 and B=220. Accordingly:

$$R = 254 + 220 = 474.$$
$$res(R) = res15(474) = 9$$
$$res(A) = res15(254) = 14$$
$$res(B) = res15(220) = 10$$
$$res15(R) = res15(A) + res15(B) = res15(14 + 10) = res15(24) = 9$$

Since res(R)=9 and res(A)+res(B)=9, it is true that res(R) =res(A)+res(B), and the check passes.

Notwithstanding the above description, the present disclosure is intended to encompass numerous embodiments including those disclosed herein as well as a variety of alternate embodiments.

Further, in at least some embodiments encompassed herein, the present disclosure relates to self-checking CPU systems and methods.

In a first aspect, a self-checking CPU system is provided that includes a primary CPU having a primary processor pipeline having multiple stages, and a core monitor. The core monitor has a checker pipeline that is parallel to the primary processor pipeline. The core monitor performs checking functions to detect whether there is a fault in executions performed by the primary CPU, a type of each checking function being based on a corresponding type of function being performed by the primary CPU. In one example, the checking functions include parity checking for data transfers and logical operations performed by the primary CPU, and residue checking for arithmetic instruction execution logic performed by the primary CPU.

Accordingly, in a second aspect, a self-checking CPU system is provided that includes a primary CPU having a primary processor pipeline having multiple stages, and a core monitor. The core monitor having a checker pipeline that is parallel to the primary processor pipeline. The core monitor performs checking functions wherein the core monitor performs checking functions that determine whether there is a fault in executions performed by the primary CPU, and the checking functions including parity checking for data transfers and logical operations performed by the primary CPU, and residue checking for arithmetic instruction execution logic performed by the primary CPU.

In examples of the self-checking CPU systems, the checker pipeline may have four stages that include a first stage that is an Instruction Address Generation (IAG) stage, a second stage that is an Instruction Cycle (IC) stage, a third stage that is a Decode & Select, (data) Address Generation (DSAG) stage, and a fourth stage that is an Execute, Data Cycle (EXDC) stage. The core monitor may include an Instruction Fetch DataPath (IFDP) that performs parity checking with respect to memory fetched instructions during the IC stage. The core monitor may include a Program Counter DataPath (PCDP) that performs residue checking on a next fetch address that is selected by the PCDP during the IAG stage. The core monitor may include an execution module that performs residue checking with respect to an ER_EX output generated by the EX module during the EXDC stage. The core monitor may include Control/Status Registers (CSR) that perform parity checking on a source operand written into the CSR from the EX module during the EXDC stage. Ultimately, the core monitor may output a fault detection signal when the core monitor detects a fault based on the result of the checking functions.

Additionally, examples of the self-checking CPU systems discussed above may have a plurality of operating modes where the core monitor is enabled that include a Supervisor mode, a Hypervisor mode, and a User mode. When the core monitor detects a fault while running in either the Supervisor mode or the Hypervisor mode, the CPU system halts execution and generates fault detection signal indicating that a fault has been detected. When the core monitor detects a fault during the User mode, the CPU system performs one of triggering a non-maskable interrupt (NMI) or implementing a reinitialization sequence.

In a third aspect, A self-checking central processing unit (CPU) method for a self-checking CPU system that includes a primary CPU and a core monitor, the self-checking method comprising: performing checking functions by the core monitor that determine whether there is a fault in executions performed by the primary CPU, the checking functions including parity checking for data transfers and logical operations performed by the primary CPU, and residue checking for arithmetic instruction execution logic performed by the primary CPU; and determining by the core monitor whether there is a fault based on the result of the checking functions. In examples where the CPU system is a four stage system, and the step of performing checking functions may include: performing checking functions during a first stage; performing checking functions during a second stage; performing checking functions during a third stage; and performing checking functions during a fourth stage. When the core monitor includes a Program Counter DataPath (PCDP), performing checking functions during the first stage may include the PCPD performing residue checking on a next fetch address that is selected by the PCDP. When the core monitor includes an Instruction Fetch DataPath (IFDP), performing checking functions during the second stage may include the IFDP performing parity checking with respect to memory fetched instructions. When the core monitor includes Control/Status Registers (CSR), performing checking functions during a fourth stage may include the CSR performing parity checking on a source operand written into the CSR from the EX module.

Embodiments described herein can be implemented in a variety of applications. For example, one or more embodiments disclosed herein are applicable to any safety processor (user-visible, or internally hidden processors for running dedicated firmware), and/or may be employed as CPU-related safety mechanisms. Notwithstanding such applications being encompassed herein, it should be appreciated that the use of the term "safety" herein is not a representation that any embodiment described or encompassed herein will operate in a safe manner in any given circumstance. Safe operation of any system may depend on many factors outside the scope of the present disclosure, such as the manner of installation, maintenance, or operation of the system. All physical systems are susceptible to failure and provision must be made for such failure.

One or more of the embodiments encompassed herein can be advantageous in any of a variety of respects. For example, as compared to error checking functions that are embedded in the CPU, the error checking functions of the present technology are separated, which may reduce delay by allowing one pipeline stage delay as opposed to greater delays. For example, while delay from fault to fault flagging could be multiple CPU stages, this is still much shorter than required detection delay which is generally approximately 1 ms. Additionally, the error checking functions of the present technology may be enabled or disabled at runtime, which may allow a mix of different ASIL criticality on a per user-tasks basis.

While the principles of the invention have been described above in connection with specific apparatus, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A self-checking central processing unit (CPU) system comprising:
    a primary CPU having a primary processor pipeline having multiple stages; and
    a core monitor, the core monitor having a checker pipeline that is parallel to the primary processor pipeline;
    wherein the core monitor performs checking functions to detect whether there is a fault in executions performed by the primary CPU, a type of each checking function being based on a corresponding type of function being performed by the primary CPU, wherein the checker pipeline has four stages that include a first stage that is an Instruction Address Generation (IAG) stage, a second stage that is an Instruction Cycle (IC) stage, a third stage that is a Decode & Select, (data) Address Generation (DSAG) stage, and a fourth stage that is an Execute, Data Cycle (EXDC) stage.

2. The self-checking CPU system of claim 1, wherein the checking functions include parity checking for data transfers and logical operations performed by the primary CPU, and residue checking for arithmetic instruction execution logic performed by the primary CPU.

3. The self-checking CPU system of claim 1, wherein the core monitor includes an Instruction Fetch DataPath (IFDP) that performs parity checking with respect to memory fetched instructions during the IC stage.

4. The self-checking CPU system of claim 1, wherein the core monitor includes a Program Counter DataPath (PCDP) that performs residue checking on a next fetch address that is selected by the PCDP during the IAG stage.

5. The self-checking CPU system of claim 1, wherein the core monitor includes an execution module that performs residue checking with respect to an ER_EX output generated by the EX module during the EXDC stage.

6. The self-checking CPU system of claim 5, wherein the core monitor includes Control/Status Registers (CSR) that perform parity checking on a source operand written into the CSR from the EX module during the EXDC stage.

7. The self-checking CPU system of claim 1, wherein the core monitor outputs a fault detection signal when the core monitor detects a fault.

8. The self-checking CPU system of claim 1, wherein the CPU system has a plurality of operating modes where the core monitor is enabled that include a Supervisor mode, a Hypervisor mode, and a User mode.

9. The self-checking CPU system of claim 8, wherein when the core monitor detects a fault while running in either the Supervisor mode or the Hypervisor mode, the CPU system halts execution and generates an external fault detection signal indicating that a fault has been detected.

10. The self-checking CPU system of claim 8, wherein when the core monitor detects a fault during the User mode, the CPU system performs one of triggering a non-maskable interrupt (NMI) or implementing a reinitialization sequence.

11. A self-checking central processing unit (CPU) system comprising:
   a primary CPU having a primary processor pipeline having multiple stages; and
   a core monitor, the core monitor having a checker pipeline that is parallel to the primary processor pipeline;
wherein the core monitor performs checking functions wherein the core monitor performs checking functions that determine whether there is a fault in executions performed by the primary CPU, and the checking functions including parity checking for data transfers and logical operations performed by the primary CPU, and residue checking for arithmetic instruction execution logic performed by the primary CPU, wherein the checker pipeline has four stages that include a first stage that is an Instruction Address Generation (IAG) stage, a second stage that is an Instruction Cycle (IC) stage, a third stage that is a Decode & Select, (data) Address Generation (DSAG) stage, and a fourth stage that is an Execute, Data Cycle (EXDC) stage.

12. A self-checking central processing unit (CPU) method for a self-checking CPU system that includes a primary CPU and a core monitor, the self-checking method comprising:
   performing checking functions by the core monitor that determine whether there is a fault in executions performed by the primary CPU, the checking functions including parity checking for data transfers and logical operations performed by the primary CPU, and residue checking for arithmetic instruction execution logic performed by the primary CPU; and
   determining by the core monitor whether there is a fault based on the result of the checking functions, wherein the CPU system is a four stage system, and the step of performing checking functions includes:
   performing checking functions during a first stage;
   performing checking functions during a second stage;
   performing checking functions during a third stage; and
   performing checking functions during a fourth stage.

13. The self-checking CPU method of claim 12, wherein the core monitor includes a Program Counter DataPath (PCDP), and performing checking functions during the first stage includes the PCPD performing residue checking on a next instruction fetch address that is selected by the PCDP.

14. The self-checking CPU method of claim 12, wherein the core monitor includes an Instruction Fetch DataPath (IFDP), and performing checking functions during the second stage includes the IFDP performing parity checking with respect to memory fetched instructions.

15. The self-checking CPU method of claim 12, wherein the core monitor includes an execution (EX) module, and performing checking functions during a fourth stage includes the EX module performing residue checking with respect to an ER_EX output generated by the EX module.

16. The self-checking CPU method of claim 12, wherein the core monitor includes Control/Status Registers (CSR), and performing checking functions during a fourth stage includes the CSR performing parity checking on a source operand written into the CSR from the EX module.

* * * * *